O. THOMPSON.
THRESHING MACHINE.
APPLICATION FILED SEPT. 10, 1912.

1,191,853.

Patented July 18, 1916.
4 SHEETS—SHEET 1.

Witnesses
F. C. Gilson
Wm. Bagger

Inventor
Ora Thompson
By Victor J. Evans
Attorney

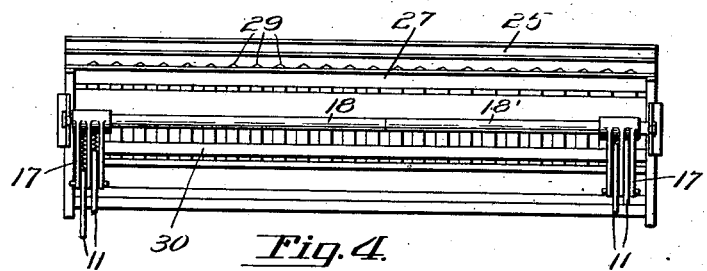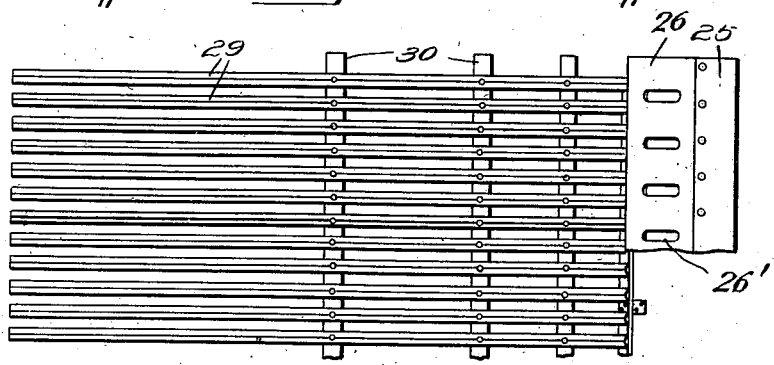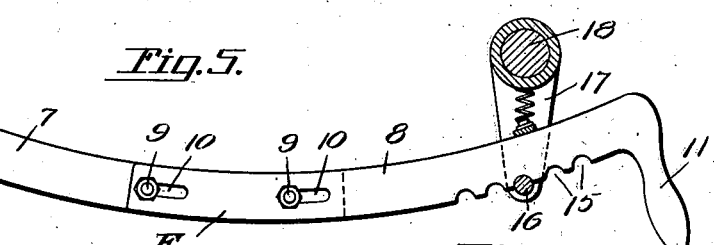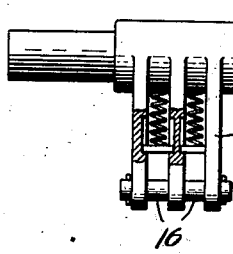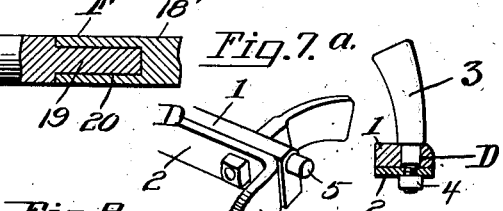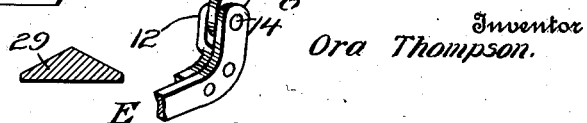

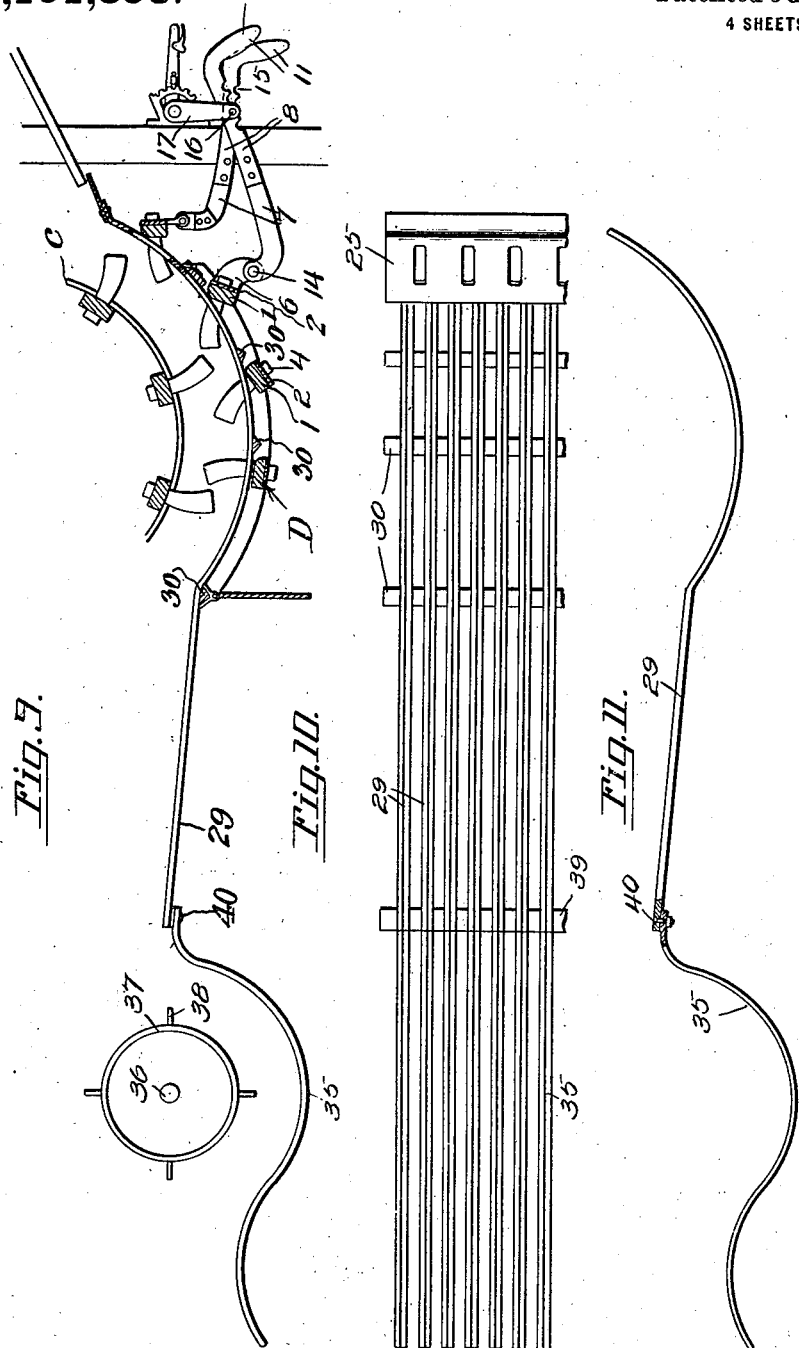

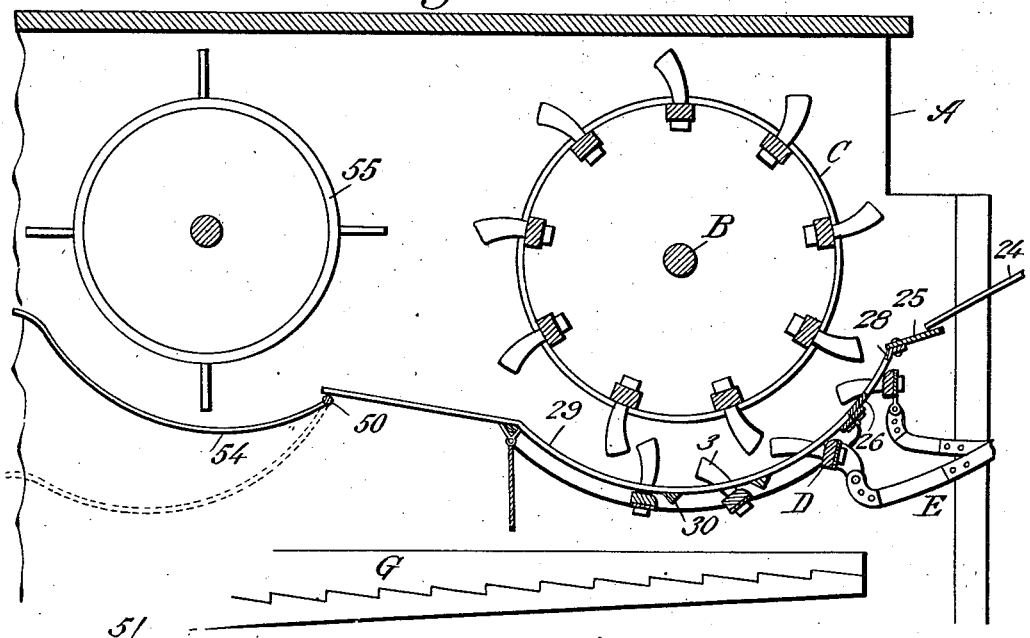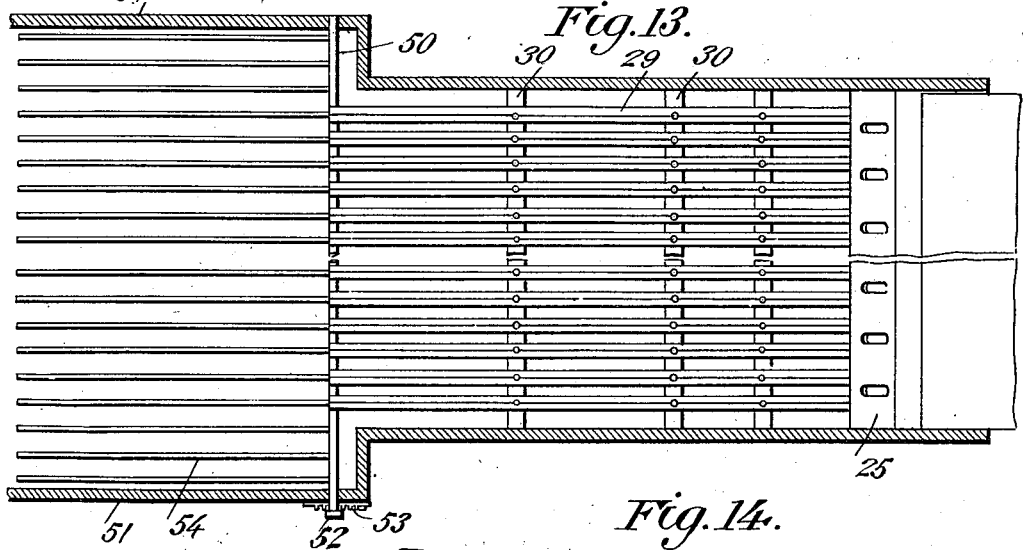

UNITED STATES PATENT OFFICE.

ORA THOMPSON, OF EARL PARK, INDIANA.

THRESHING-MACHINE.

1,191,853.

Specification of Letters Patent.   Patented July 18, 1916.

Application filed September 10, 1912.   Serial No. 719,613.

*To all whom it may concern:*

Be it known that I, ORA THOMPSON, a citizen of the United States, residing at Earl Park, in the county of Benton and State of Indiana, have invented new and useful Improvements in Threshing-Machines, of which the following is a specification.

This invention relates to threshing machines, and it has particular reference to those parts of a threshing machine which may be described as constituting particularly the threshing or grain detaching mechanism and the preliminary separating mechanism.

The present invention may to some extent be described as being an improvement upon the device for which Letters Patent of the United States, No. 970,973, were issued to me on Sept. 20, 1910.

The Letters Patent above referred to embodied a concave comprising a plurality of pivotally supported tooth-carrying bars and means for supporting and adjusting said bars, the latter being used in connection with a slotted screen or plate through which the teeth were arranged to project.

One important object of the present invention is to construct the concave in such a manner that it will be practically impossible for any loose grain to be carried rearward with the straw, the separating action being performed almost entirely at the time of detaching the grain kernels from the heads.

Another object of the invention is to so construct and arrange the members constituting the concave that the material fed into the machine will not at first be violently obstructed by the teeth of the concave, the latter being placed slantwise, thus subjecting the material gradually to the impact of the cylinder teeth instead of with violent preliminary blows, the result being that while the grain will be thoroughly detached, the straw will not become broken up or bruised to the extent which is usually the case.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
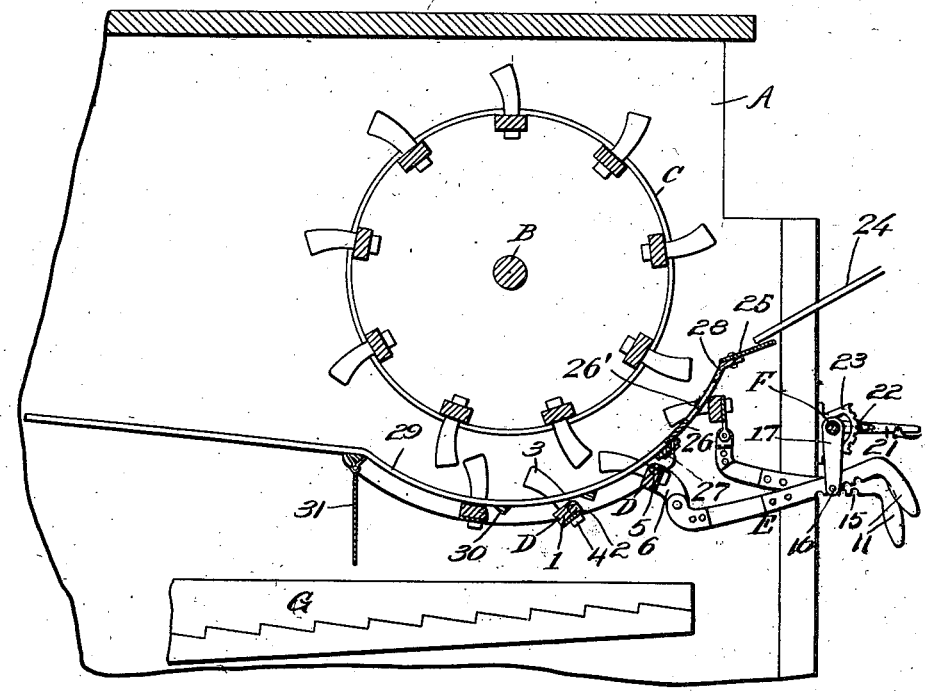
Figure 2:
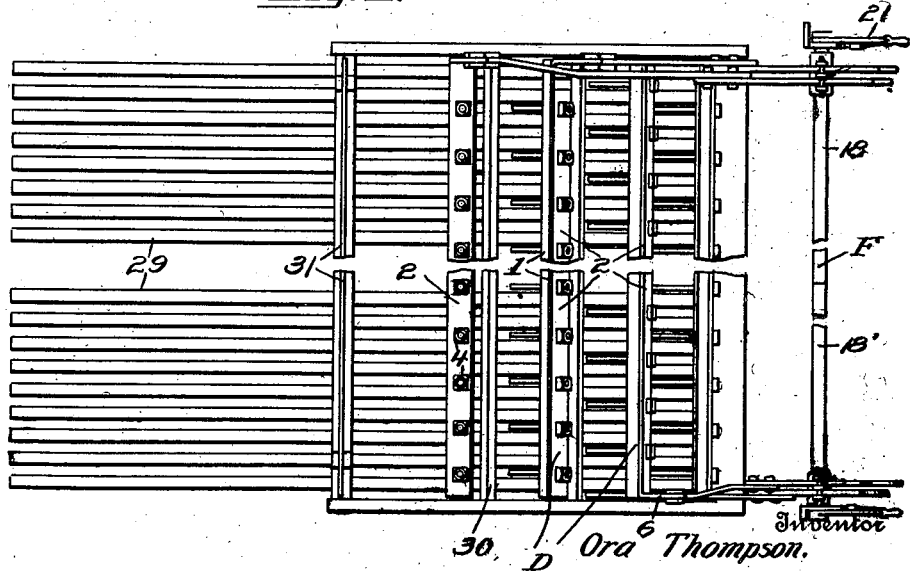

In the drawings, Figure 1 is a vertical sectional view of the front end of a threshing machine constructed in accordance with the invention. Fig. 2 is a bottom plan view of the concave. Fig. 3 is a front elevation of the concave. Fig. 4 is a top plan view of the concave screen. Fig. 5 is a side elevation of one of the adjusting members of the concave bars. Fig. 6 is a detail view in sectional elevation of part of the adjusting mechanism. Fig. 7 is a transverse sectional view of one of the concave bars. Fig. 7ª is a perspective detail view of the end of one of the concave bars. Fig. 8 is a transverse sectional view of one of the screen bars. Fig. 9 is a longitudinal sectional view of a slightly modified form of the invention. Fig. 10 is a detail top plan of a portion of the concave screen used in the modified form of the invention. Fig. 11 is a side elevation of one of the concave screen bars. Fig. 12 is a longitudinal sectional view illustrating a further modification. Fig. 13 is a detail top plan view of the screen and the movably supported fingers used in said modification showing also parts of the sides of the casing of the machine. Fig. 14 is a detail side view showing the exterior of the casing.

Corresponding parts in the several figures are denoted by like characters of reference.

The frame A of the threshing machine supports for rotation a shaft B carrying the cylinder C of ordinary construction. Supported for oscillation beneath the cylinder and equidistantly from the axis of the cylinder shaft are a plurality of bars D. These bars, for the sake of convenience and economy, are composed each of a body portion 1 of cast iron and a reinforcing strip 2 of wrought iron or steel, said body and reinforcing strip being connected together by the shanks of the teeth 3 which are extended therethrough and equipped with nuts 4 whereby the parts are assembled. The bars D are of approximately rectangular cross section having rounded upper front corners over which material fed to the machine may easily slide, irrespective of the position of the bars, and the supporting pivots or trunnions 5 of said bars, which may be integral with the body portions 1, are set well forward or adjacent to the front edges of the bars, so that when rocking upon said pivots or trunnions, the bars will bodily swing downwardly, as will be clearly seen by reference to Fig. 1. The reinforcing strips 2 are provided with terminal downturned portions or extensions 6 which may be of any desired shape and which may be located at any preferred angle with reference to the bars, said extensions constituting cranks with which the rearward ends of the operating bars E may be pivotally connected. It will be understood that as is the case in my former patent, the toothed bars are preferably arranged in groups, the cranks and operating rods of one group being disposed adjacent to the left side of the machine, while the cranks and operating rods of the other group are disposed adjacent to the right side of the machine. Thus, in Figs. 1 and 2, four toothed bars have been shown, of which the two rear bars have cranks associated with operating rods at the left side of the machine, while the two forward toothed bars have cranks associated with operating rods disposed adjacent to the right side of the machine.

The operating rods E, as will be seen from the drawings and especially by reference to Fig. 5, are each composed of two parts or members 7, 8, adjustably connected together by means of bolts 9 operating in slots 10 in one of the members. The front member 8 is provided with a handle 11, and the rear member 7 is provided with a plate 12 riveted or otherwise secured upon said bar and apertured at 13 for the passage of a pivotal member 14, whereby it is connected by the crank member 6 of one of the toothed bars. The operating rods E, being each composed of two adjustably connected members, may be readily fitted to various makes of machines for operation in the most advantageous manner. The front member 8 of each operating rod is provided adjacent to its front end with notches 15 in the underside thereof for engagement with a rod 16 supported by means of arms 17 depending from a rock shaft F which is supported for rotation in suitable bearings adjacent to the front end of the machine, said rock shaft being composed of two independent portions 18 and 18′, one of which is provided with a journal 19 engaging a socket in the end of the other member. Each of the members 18, 18′ has a terminal operating lever or handle 21 equipped with a stop member 22 adapted to engage a segment rack 23 upon the frame of the machine, whereby the parts may be secured in adjusted position. This construction, which is substantially identical with that shown in my former patent above referred to, enables each toothed bar to be tilted or actuated independently of the remaining toothed bars, or each group of toothed bars may be simultaneously tilted by actuating one of the rock shaft sections 18 or 18′, as will be readily understood. It will thus be seen that provision is made for tilting the toothed bars in such a manner as to present the teeth thereof at any desired angle within the limits of their respective adjustments with reference to the teeth of the cylinder with which they are to coact. It may be here stated that while in the accompanying drawings only four toothed bars have been shown, the number may, within the scope of the invention, be varied to any extent.

Suitably supported beneath the cylinder C is a grate composed of a plurality of suitably curved bars 29 which extend rearwardly through the casing of the machine beneath the cylinder and which coact to form the supporting grate of the concave, said bars being sufficiently spaced to enable the teeth 3 of the bars D to operate therebetween. The grate bars are of triangular cross section, the shape being that of an isosceles triangle having a base of a width considerably exceeding the height, as best seen in Fig. 8. The forward ends of the grate bars are curved in the direction of their length to a shape concentric with the axis of the cylinder carrying shaft, and the rear ends of said grate bars are substantially straight, as will be clearly seen in Fig. 1. The grate bars are assembled and supported in substantially parallel relation by means of cross bars 30, which are of substantially the same cross section as the grate bars, but which are inverted so as to present their flat sides uppermost to support the flat undersides of the grate bars with which they may be connected by means of rivets or in any suitable convenient manner. The cross bars 30, the ends of which may be secured upon the sides of the casing of the machine, are disposed closely adjacent to the forward edges of the tooth carrying bars D, the particular reason for this disposition being to prevent wet and coarse straw which is liable to work downward between the grate bars from striking the front edges of the toothed bars where such straw would be liable to become entangled and to pile up, thus forming an obstruction which might result in necessitating a stoppage of the machine for the purpose of cleaning out the obstruction. With the disposition of the cross bars or supporting bars 30 as herein shown, liability to the formation of such obstructions is prevented.

The forward ends of the grate bars 29 terminate between the first and second tooth carrying bars D, reckoning from the front of the machine, and said bars are firmly connected with a cross bar 27 with which is hingedly connected a curved plate 26 having slots 26' for the passage of the teeth of the front bar, the rocking of which will thus not be interfered with. The hinged plate 26, for the retention of which in adjusted position any convenient means may be employed, has a forwardly extending flange or ledge 25 upon which the feed table 24 may be supported so that said feed table will accommodate itself to various adjustments of the hinged plate 26. It will be readily seen that by proper adjustments of the hinged plate 26, the admission of material between the cylinder and the front end of the concave may be facilitated or obstructed, as may be desired, and according to the nature and condition of such material. It will also be obvious that this adjustable plate clearly coöperates in connection with the tiltable tooth-carrying bars and with the grate bars 29 and supporting bars 30 of the concave to promote the most advantageous results and that, while adjustment of the plate 26 is independent of that of the tooth carrying bars, the several parts coöperate to one single end, namely, to admit the proper quantity of material to be operated upon by the threshing mechanism in such fashion as to avoid choking and to cause separation of the grain from the straw to be effected at the earliest possible moment.

Hingedly associated with one of the cross bars 30, preferably the rearmost one, and depending therefrom in the direction of the grain pan G, is a shield 31 which may be constructed of sheet metal in any suitable manner and which hangs loosely suspended for the purpose of preventing loose kernels of grain being hurled to the rearward of the machine by the momentum of the cylinder and thereby becoming mixed with the straw again so as to necessitate subsequent separation. By the presence of this shield or curtain practically all the grain that is separated from the straw by the conjoint action of the cylinder and the toothed bars will become separated at this point and will not become subsequently mixed with the straw.

Under the modified form of the invention illustrated in Figs. 9, 10 and 11 I connect with the grate bars 29 correspondingly shaped rearward extensions 35 having downwardly curved front portions which are substantially concentric with the axis of a shaft 36 supporting a beater 37 having radially extending teeth 38. The extension bars 35 may be connected with the rear ends of the grate bars 29 by means including a cross bar 39 and rivets 40. By this construction the length of the grate member is greatly extended, thus improving and promoting the operation of separating the grain from the straw and coarse particles, while the additional beating to which the straw is subjected will tend to loosen any kernels of grain that still remain in the straw, thus rendering the entire operation thoroughly effective.

By the further modification illustrated in Figs. 12 and 13, the construction and arrangement of the cylinder and the grate are substantially the same as shown in Figs. 1 and 2. Adjacent to the rear ends of the grate bars 29 is a rock shaft 50 supported in the sides 51 of the casing of the machine through which one end of said rock shaft extends, it being provided with a lever or handle 52, whereby it may be actuated, said handle being capable of engaging a rack segment 53, whereby the rock shaft may be retained in adjusted position. The rock shaft carries a plurality of rearwardly extending arcuate fingers 54 which extend beneath a beater 55, which latter is supported for rotation in rear of the threshing cylinder C, the axis of said beater being preferably disposed in a plane slightly above that of the axis of the threshing cylinder. It will be observed that the beater 55 is intended and adapted to coact with the fingers 54 in like manner, as the beater 37 in Figs. 9, 10 and 11 coacts with the grate bar extensions 35. By making the fingers adjustable by means of the rock shaft, however, the said fingers may be disposed in the most advantageous position with reference to the beater, according to the volume and character of straw that is to be handled. Thus, if the volume of straw is small, the points of the fingers will be disposed relatively close to the beater, as shown in Fig. 12 in full lines, while if a large quantity of straw is to be handled, and particularly if the straw is wet, the fingers may be shifted to the position indicated in dotted lines in said figure, so that the straw while subjected to the action of the beater will not be obstructed, but will pass freely in a rearward direction. It will also be noticed that in Fig. 12 the beater has been set reasonably close to the cylinder, so that the straw and grain may receive all the advantage of separation due to this feature of the invention in close proximity to the front end of the machine so that the straw may be then subjected to agitation in the usual manner practically the length of the machine in rear of the beater, thereby obtaining all the advantages of this improvement without wasting space in the separator.

In the operation of this invention, it is preferred that the toothed bars be disposed substantially as shown in Figs. 1 and 9, that is, with the teeth of the forward bar presented in an approximately horizontal position, while the upward slant of the teeth associated with the following bars is gradually increased until the teeth of the rear bar are presented substantially upright. The material that is fed to the machine will thus under the impact of the cylinder teeth slide or glance over the first teeth of the concave bars and will not be chopped up or cut into fine pieces, as is the case when the teeth are all presented straight up or in alinement with the cylinder teeth. The straw in coarse form facilitates subsequent separation as the kernels are more easily shaken out than they would be if the straw is cut up fine and chaffy. Fine straw is more compact than coarse; hence, by keeping the straw coarse grain is saved; the separation is facilitated and improved, and power is also saved, as it obviously takes power to cut up the straw. Time is also saved because straw in coarse form is more easily handled and not so liable to waste in the process of handling, and, finally, it may be stated that coarse straw commands a better market price than fine or chaffy straw.

With regard to the grate, it may be pointed out that by reason of the shape of the bars 29, it will be impossible for kernels of grain to lodge upon the upper sides of said bars and to move rearwardly along with the straw, every kernel being positively deflected downwardly into the grain pan. Any injury to the grate may be readily repaired, because it will be necessary to replace only such part as is broken. The grate constructed as herein described may be readily placed in position or detached from the machine. Finally, it has been found in actual practice that the grate is practically incapable of being choked or obstructed, no matter what may be the condition of the material that is being operated upon, because the only transverse obstructions are the cross bars 30 beneath the grate bars, and the latter are of such shape that practically all material will glide or move freely in a rearward direction. Even wet or coarse straw, which is notoriously difficult to handle, has been found to pass freely over the grate constructed as herein described.

By introducing the modification illustrated in Figs. 9 to 14, inclusive, the separating capacity of the machine is greatly increased without a material increase in the cost of manufacture.

In threshing rice or any grain that is materially damaged by reason of the kernels being cracked or broken by striking against parts placed crosswise in the mechanism of the machine with great force imparted by the velocity of the cylinder, it will be found that the number of kernels damaged will be greatly decreased because nothing except the toothed bars is placed in an obstructing position crosswise of the machine, and hence a reduced number of parts are exposed for the kernels to strike against.

In the working of the machine it will be observed that the notches in the operating rods E provide simple and effective means of rocking each tooth bar independently of the remaining tooth bars, thus enabling the several tooth bars to be set or adjusted in different positions independently of the remaining tooth bars. This is regarded as an important and valuable feature of the invention, without which it would be impossible to arrange the teeth of the several bars at a different slant, as clearly indicated in Fig. 1 of the drawings. The importance of this arrangement has already been fully pointed out.

In the manufacture of the present invention it is desired to point out that the cost of the manufacture is considerably reduced as compared with other similar devices, as, for instance, the device shown in my previous Patent No. 970,973, to which reference has hereinbefore been made. The parts constituting this invention may be made at comparatively small expense, involving no necessity for complicated or special machinery. The parts, such as the grate bars may also be regarded as interchangeable, and repairs may, therefore, be made in case of necessity with little trouble and at comparatively small expense. These considerations are obviously important in a device of the class to which this invention relates.

Having thus described the invention, what is claimed as new, is:—

1. In a threshing machine, a casing, a pivoted tooth carrying bar comprising a body portion of approximately rectangular cross section having a rounded front corner and provided with journals at the ends adjacent to the front edge thereof to enable such bar to be bodily tilted, and means for tilting the bar and for supporting it in adjusted position.

2. In a threshing machine, a tooth carrying bar comprising a flat body portion having trunnions at the ends thereof adjacent to the front edge, a flat reinforcing bar extending the entire length of the body portion and having a crank at one end, and teeth having threaded shanks extending through the body portion and the reinforcing bar and provided with nuts whereby the parts are assembled together.

3. In a threshing machine, a grate comprising a plurality of longitudinal substantially parallel bars of triangular cross section, said bars being arranged with their flat faces downward to present oppositely inclined top faces, and means for assembling and supporting said bars, said bars being curved at their forward ends to present a concave grate, in combination with tooth carrying bars supported beneath the grate bars and having teeth extending upwardly therebetween, and a cylinder supported for coöperation with the toothed bars.

4. In a threshing machine, a cylinder, tooth carrying bars mounted below the cylinder in concentric series for coöperation therewith and concave grate bars interposed between the cylinder and the tooth carrying bars, the teeth of the latter projecting between the grate bars, said grate bars being of triangular cross section with oppositely inclined faces exposed upwardly to prevent lodgment thereon of grain detached by the joint action of the cylinder and the tooth carrying bars.

5. In a threshing machine, a concave including a plurality of pivotally supported toothed bars, means for adjusting the same and for supporting them at various adjustments, and a grate comprising a plurality of longitudinal substantially parallel bars of triangular cross section, and transverse connecting bars likewise of triangular cross section, said transverse supporting bars being disposed with their bases opposed to the bases of the longitudinal bars and adjacent to the front edges of the toothed bars.

6. In a threshing machine, a grate comprising a plurality of suitably connected longitudinal bars of triangular cross section disposed in parallel relation and having unobstructed downwardly inclined upper faces and cross bars disposed beneath said longitudinal bars and connecting the same, in combination with rearward extensions detachably connected with the longitudinal bars and having curved portions, and a toothed beater supported for rotation above and coöperating with the curved portions of the extension bars.

In testimony whereof I affix my signature in presence of two witnesses.

ORA THOMPSON.

Witnesses:
   CHESTER WINSHIP,
   JAMES BOLDMAN.